Figure 5:
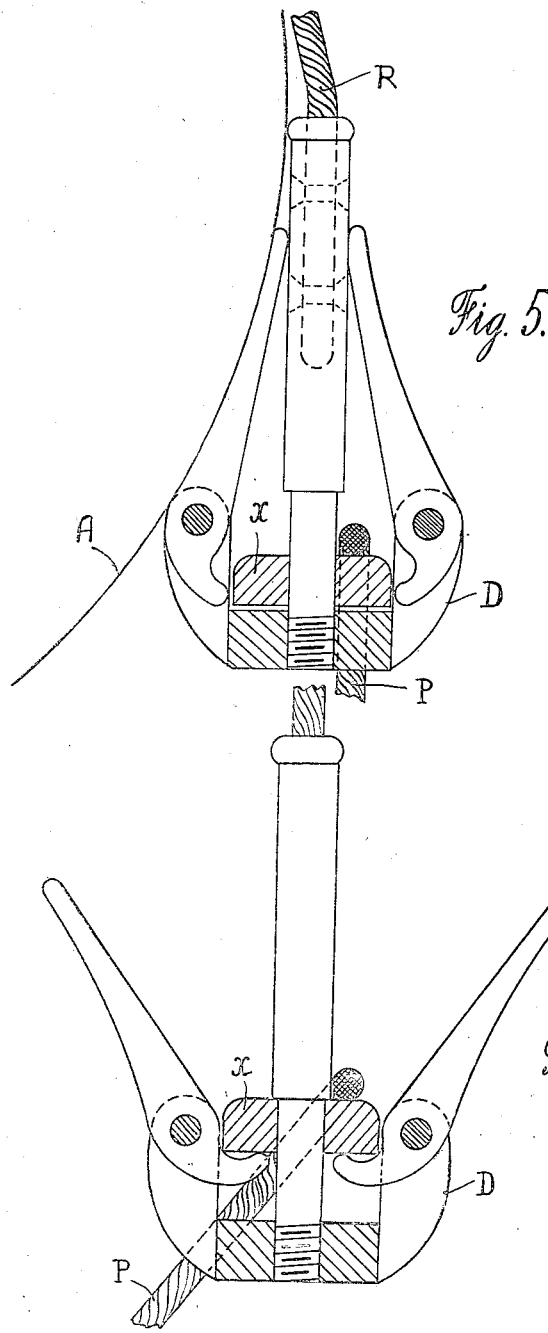

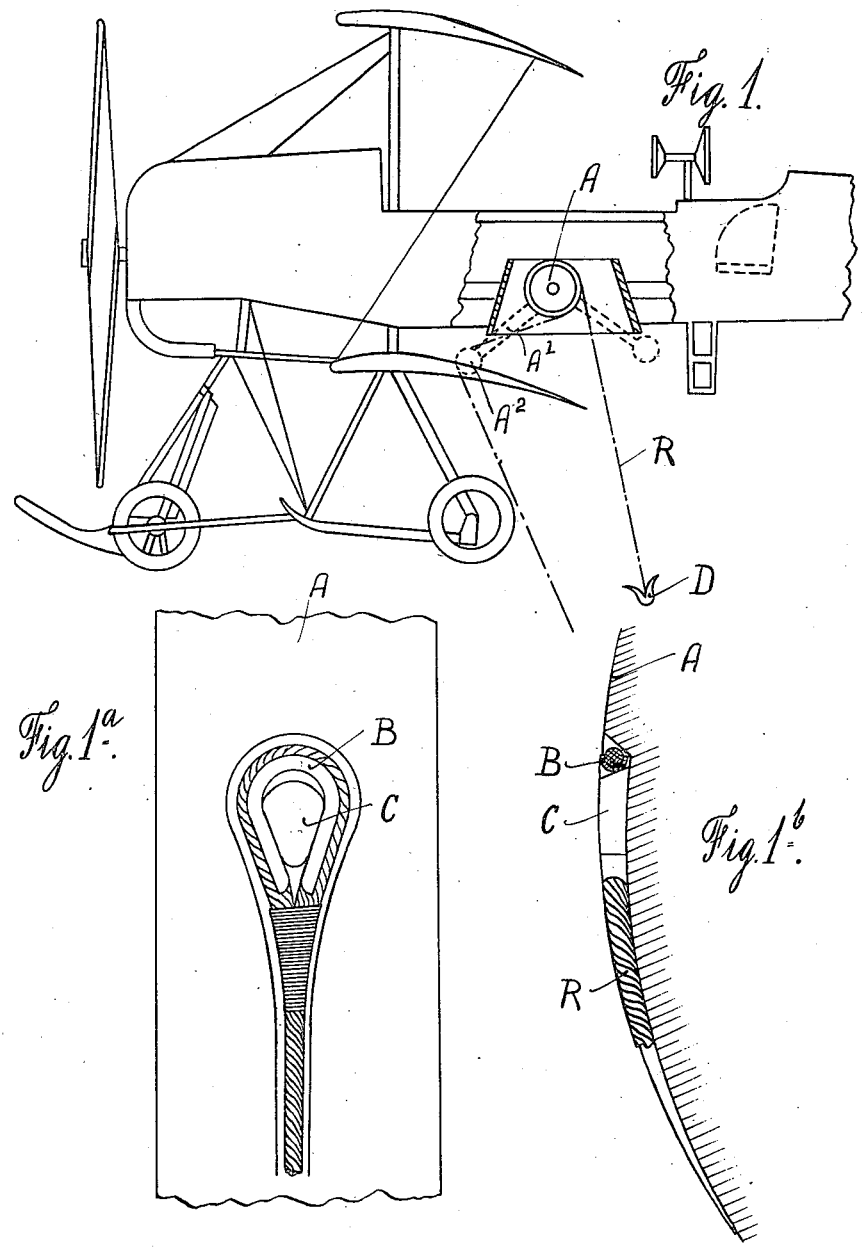

C. S. SNELL.
MEANS FOR SUPPLYING STORES OR OTHER ARTICLES TO AERIAL CRAFT.
APPLICATION FILED OCT. 16, 1912.
1,070,197.
Patented Aug. 12, 1913.
7 SHEETS—SHEET 2.
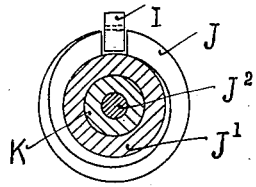
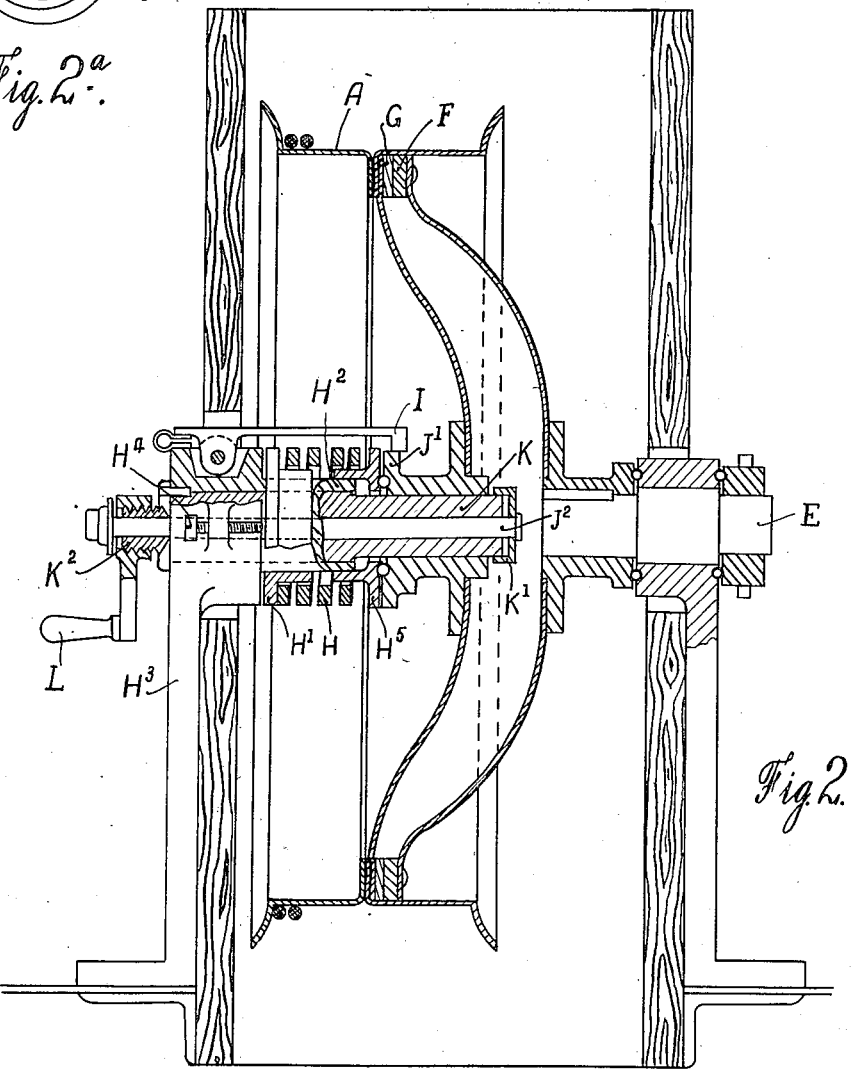

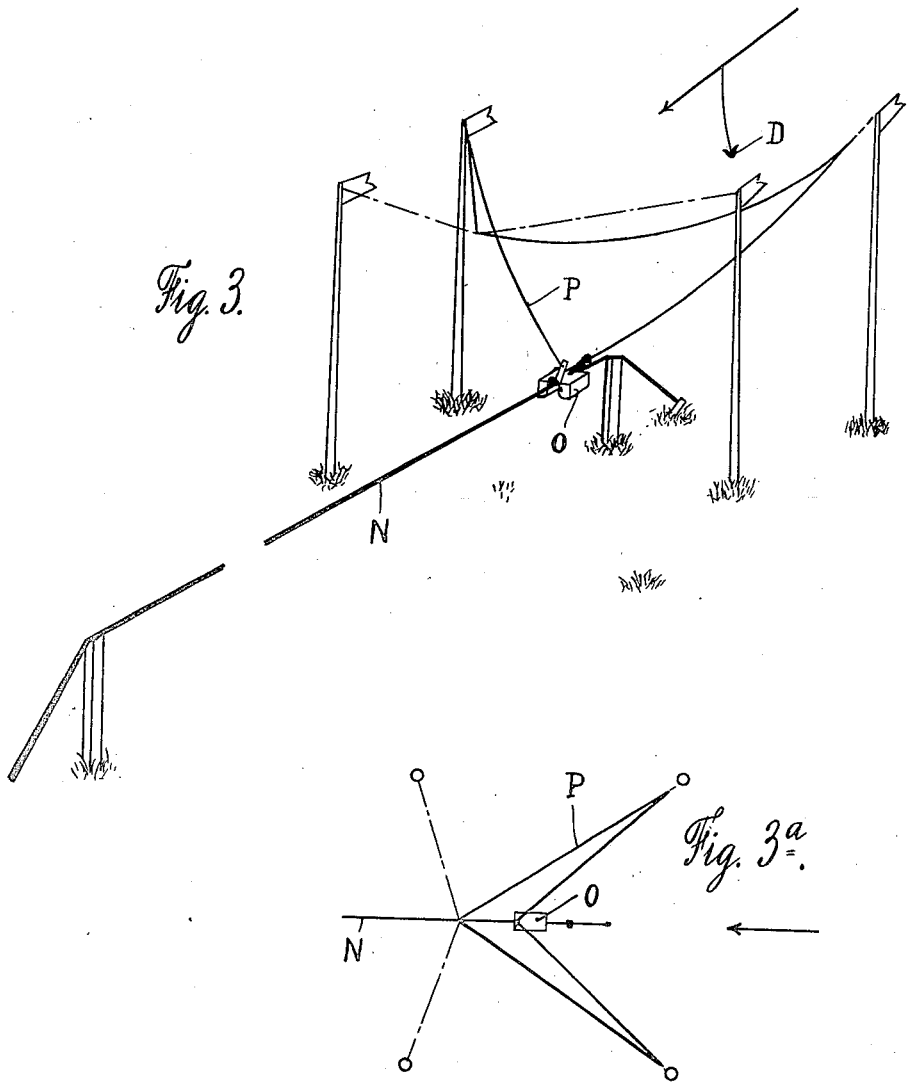

C. S. SNELL.
MEANS FOR SUPPLYING STORES OR OTHER ARTICLES TO AERIAL CRAFT.
APPLICATION FILED OCT. 16, 1912.
1,070,197.
Patented Aug. 12, 1913.
7 SHEETS—SHEET 4.
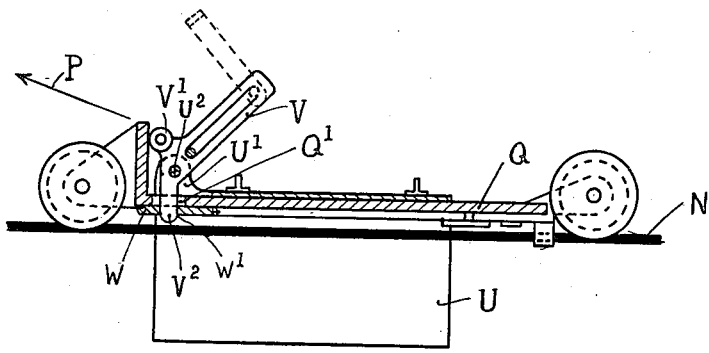
Fig. 4.
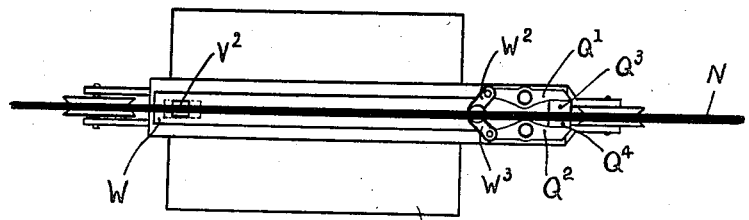
Fig. 4ª.
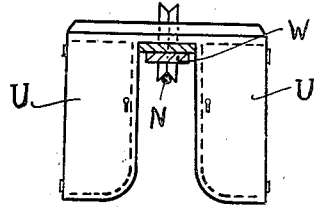
Fig. 4ᵇ.
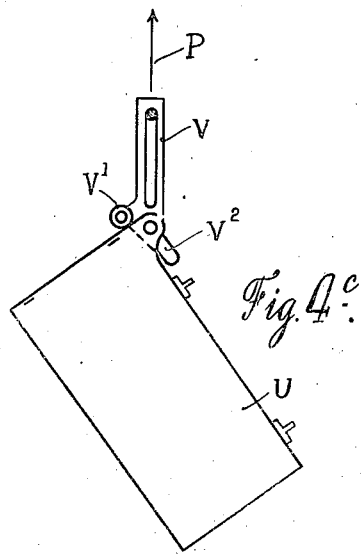
Fig. 4ᶜ.
Witnesses:
H. Spencer.
Walter Allen
Inventor,
Charles S. Snell,
by Herbert W. Jenner.
Attorney.

C. S. SNELL.
MEANS FOR SUPPLYING STORES OR OTHER ARTICLES TO AERIAL CRAFT.
APPLICATION FILED OCT. 16, 1912.
1,070,197.
Patented Aug. 12, 1913.
7 SHEETS—SHEET 6.
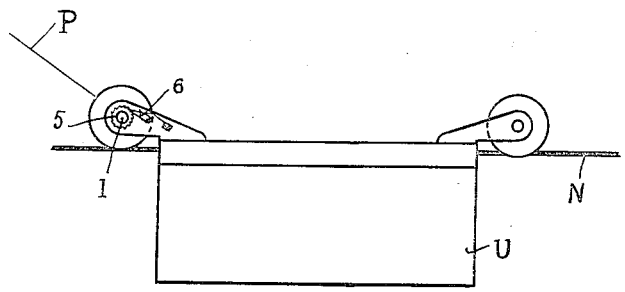
Fig. 6.
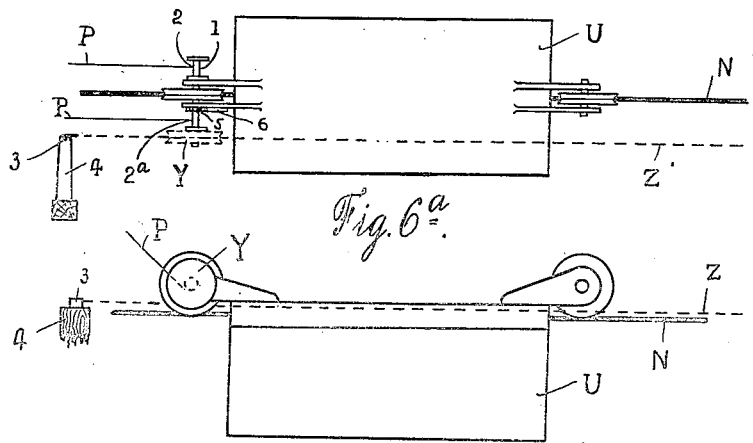
Fig. 6ᵃ.
Fig. 6ᵇ
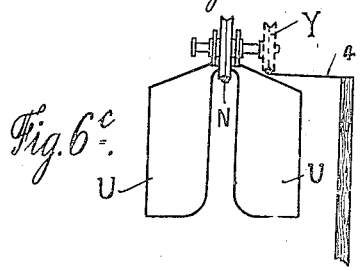
Fig. 6ᶜ.
Witnesses:
H. Spencer.
Walter Allen
Inventor
Charles S. Snell,
by Herbert W. Penner
Attorney

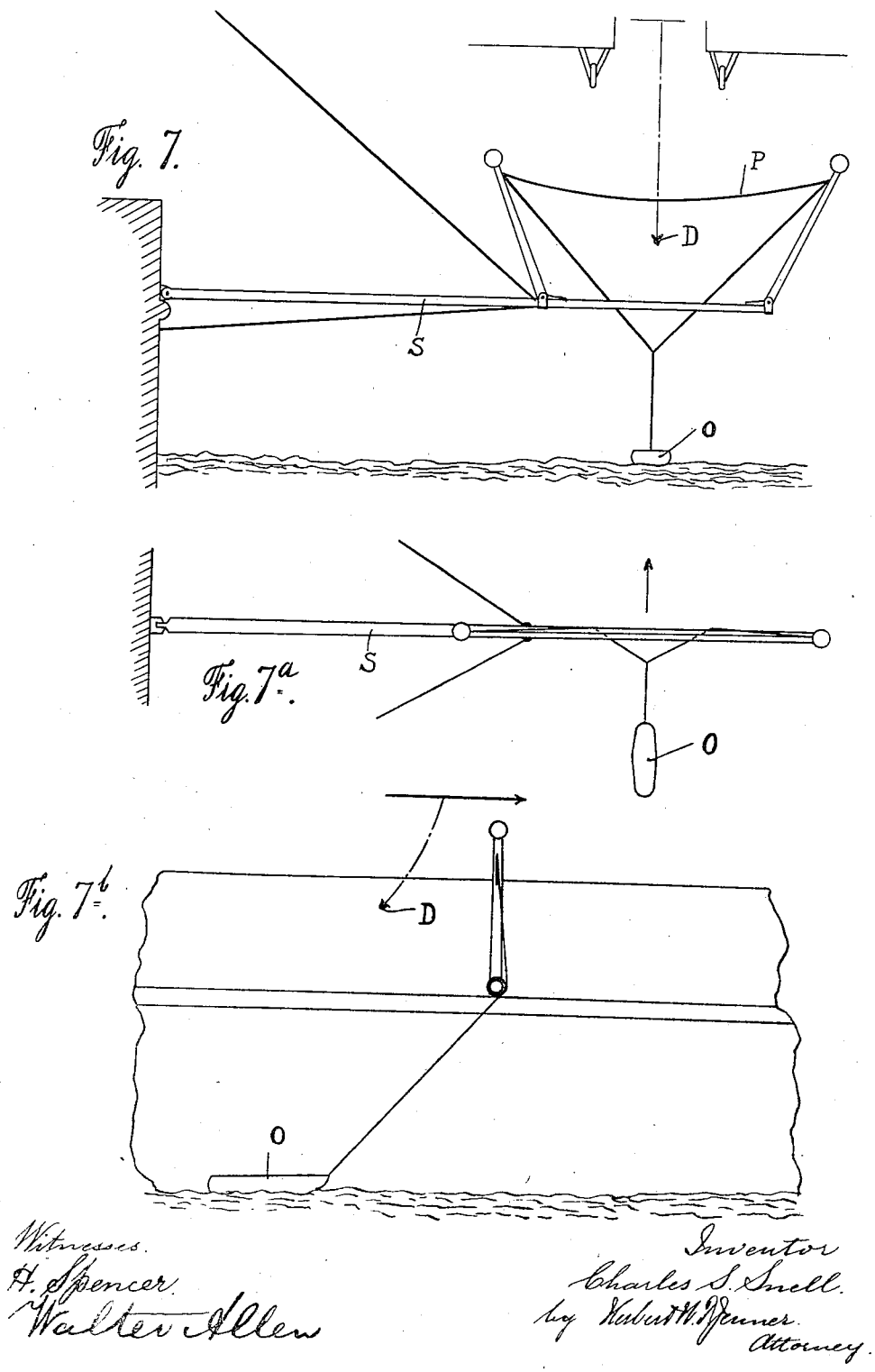

UNITED STATES PATENT OFFICE.

CHARLES SCOTT SNELL, OF LONDON, ENGLAND.

MEANS FOR SUPPLYING STORES OR OTHER ARTICLES TO AERIAL CRAFT.

1,070,197.  Specification of Letters Patent.  Patented Aug. 12, 1913.

Application filed October 16, 1912. Serial No. 726,037.

*To all whom it may concern:*

Be it known that I, CHARLES SCOTT SNELL, a subject of the King of Great Britain and Ireland, residing at London, England, have invented certain new and useful Improvements in Means for Supplying Stores or other Articles to Aerial Craft; and I do hereby declare the following to be a full, clear, and exact description of the invention, such as will enable others skilled in the art to which it appertains to make and use the same.

This invention has for its object to provide means whereby stores, such as liquid fuel or explosives and despatches for military purposes, and the like, can be supplied to aeroplanes or airships without the necessity of stopping their flight and landing. It is applicable also to aeroplanes or the equivalent when used at sea.

One of the principal advantages of my invention lies in the elimination of any considerable shock to the vessel at the moment of engagement with the load to be taken up, and another advantage lies in the ultimate disconnection of the line, if the stress exceeds a given amount.

Further features of the invention appear from the following description.

In order to make the arrangement clear, I will describe one form of my invention as applied to an aeroplane, thereby adapting it to pick up a load while maintaining its flight.

In the accompanying drawings Figure 1 illustrates the fore part of a biplane with a winding drum and grapnel fitted therein. Figs. 1ª and 1ᵇ show the method of attaching the grapnel line to the drum whereby it is readily detached when the wire is drawn off. Fig. 2 is a section of the winding drum and driving gear in the aeroplane, and Fig. 2ª is a section of the boss of the drum. Fig. 3 is a perspective view of a form of ground equipment ready for the arrival of an aeroplane, and Fig. 3ª is a plan of the same. Fig. 4 is a section of the carrier running on the "ground equipment". Fig. 4ª is an inverted plan, and Fig. 4ᵇ is a cross section of same, Fig. 4ᶜ shows the position of the boxes when suspended from the aeroplane. Figs. 5 and 5ª show details of the grapnel, Figs. 6, 6ª, 6ᵇ, and 6ᶜ are details of a form of carrier for use with a grapnel which cannot cross over the winding drum. Fig. 7 shows the equipment applied to a ship for sea use, Fig. 7ª is a plan, and Fig. 7ᵇ is a side view of the same.

In the accompanying drawings Fig. 1 is a partial side elevation of a biplane fitted with my equipment as far as it relates to the portion carried by the aerial craft. In this figure it will be seen that to a suitable part of the frame of the aeroplane, I attach a drum A, conveniently protected by a casing open at top and bottom and operated by power, as will be hereinafter described. Upon the drum is wound a length of flexible steel cable. As shown in the enlarged plan and section Figs. 1ª and 1ᵇ the inner end of the cable finishes in an eye (marked B) which engages with a stud C on the drum in such a manner that when the cable is completely run out it becomes entirely disengaged. The outer end of the cable is furnished with a grapnel (or its equivalent) D in Fig. 1, to engage with the load, or an accessory to the load in the shape of a steel cable, which forms a wide loop when held in a manner hereinafter described.

The cable drum on the aeroplane is by means of a slip clutch as shown in Fig. 2, put in connection with a shaft E driven by the propelling engine (by any well known mechanical connecting gear) so that the tension of the cable, when the cable is engaged with a stationary load cannot exceed a prearranged amount and any tension on the cable exceeding this amount results in the cable being drawn off the drum in spite of the inwinding action of the driving gear. This is insured by transmitting the motion of the driving disk F to the driven disk G (which forms part of the drum) through frictional contact. The limit of force transmitted is governed by the pressure upon the surfaces in contact which in turn is determined by the power exerted by the spring H. The latter is provided with an abutment ring H¹ the position of which along a tubular extension H² of the side bracket H³ is controlled by two side screws one of which H⁴ is visible in the view given. The spring exerts its force upon a sliding sleeve H⁵ which through a ball race forces the boss J¹ of the drum outward along the rigid arm or fixed shaft K. Such movement is checked by contact between the two friction disks G and F which therefore are pressed together with the regulated force exerted by the spring H. The drum A, in order to retain the grapnel (at the end of the rope leading from the drum) at a steady level below the machine, must be stationary until the grapnel engages with the load to be lifted. It is therefore temporarily held out of contact with the power driven disk F. This is effected as explained below by the detent I which slips over the flange J of the boss $J^1$ of the drum A which is free to rotate on the fixed shaft K. The withdrawal of the drum from contact with disk F and the holding back of the drum is effected by the pressure of a cap $K^1$ which is drawn inwardly and bears upon the outer end of the boss $J^1$ through the medium of a declutching rod $J^2$ free to slide through the center of the fixed arm K and having at its other extremity a washer and nuts as shown. By the rotation in one direction of the handle L it travels outward upon the threaded extremity $K^2$ of the fixed shaft K and carries with it the declutching rod, its cap $K^1$, and the boss $J^1$ until the flange J passes under the detent far enough to allow the latter to descend and hold it. The handle L is now rotated in the reverse direction leaving the rod $J^2$ free to travel back again, the drum being entirely held out of action by the detent alone. It may thus be stationary with a few fathoms of the cable hanging down, with the grapnel at the end ready for action, although the power driven disk is revolving. By reason of the flange $J^1$ being formed with a spiral or cam shaped bed (see section in Fig. $2^a$) the unwinding of the cable when the grapnel engages with the load causes the detent to slip and the friction disks to engage.

The load to be taken up is preferably placed in a carrier which has wheels adapting it to run on a wire rope after well known methods used on wire ropeways. To the carrier (or to its load if the carrier is not to be lifted) is attached a wire loop which is temporarily held widely spread by light lashings to adjacent posts which break away directly the grapnel engages with it and pulls upon the loop. The arrangement of wire ropeway is shown in Fig. 3, where the ropeway N is strained between two terminal posts, and accommodates the wheel equipped load O, the cable P of which has its bight held open by light lashings (or other easy and quick releasing means) to a set of posts whereby the flying aeroplane (represented by the arrow shown) carrying a grapnel D eventually becomes engaged with the cable, breaks the lashings, and pulls upon the load tending to carry it along the ropeway. As it will not attain the speed of the aeroplane for some moments, the drum on the aeroplane is first set revolving in an unwinding direction without resistance other than its own inertia, then by the slip clutch the friction gear comes into play and exercises a predetermined tendency to "wind in" the cable thus conveying a steady acceleration to the load, until eventually its speed reaches or even exceeds that of the aeroplane, although it is still behind it. As it is desirable that the load shall not under-run the latter the angularity of the pull is caused to operate a brake by the following means: Referring to Figs. 4, $4^a$, $4^b$, and $4^c$, the construction of carrier and the application of its load will be understood. The carrier (see Fig. 4) consists of a base piece Q having a pair of lugs at either end, each accommodating a grooved wheel suitable for traveling on a wire ropeway a part of which marked N is shown. This base piece is fitted with a brake gear as hereinafter explained. A pair of boxes or panniers marked U throughout the figures and more particularly shown in Fig. $4^b$ are placed over and rest upon the base piece Q. These boxes contain stores, despatches or the like. The panniers (see Fig. 4) have two lugs one of which is marked $U^1$ and accommodate a pin $U^2$, upon which is freely carried a flat link V having a long slot in its upper extremity, and being provided with a wheel $V^1$ upon a horn like projection. A tail piece $V^2$ projects downwardly through an aperture $Q^1$ in the base piece of the carrier and enters a slot $W^1$ in the brake bar W. Referring to Fig. $4^a$, which is an inverted view of the carrier and pannier it will be seen that the aft extremity of the brake bar has two links $W^2$ and $W^3$ pivoted upon it attached also to two levers $Q^1$ and $Q^2$ forming a toggle joint whereby pressure forcing the brake bar W toward the toggle joint causes the lever extremities to come together and cause two wood blocks $Q^3$ $Q^4$ in which they terminate to grip the rope lying between them. The drag rope by which the carrier is drawn over the ropeway is shackled to the link, the pin in the shackle being free to run up and down in the slot. Dragging the load by means of the slotted lever V (pivoted to the panniers) it is evident that when the angle of the cable (due to the load tending to under-run the aeroplane) P is such as to cause the pin running in the slot to travel to the outer end of the lever (see dotted position) the lower projecting end of the lever tends to force backward the brake bar W, and through the toggle gear as shown in the inverted plan Fig. $4^a$, to cause the brake blocks to grip the wire and retard the speed. A fall of speed in the carrier alters the angularity of the pull, the pin runs down the slot, the brake action ceases, and the load is free to follow the aeroplane at the proper speed until it reaches the end of the ropeway and the carrier falls to the ground while the load is lifted by the drum on the aeroplane.

The grapnel as shown in Figs. 5 and $5^a$ consists conveniently of pivoted prongs which are nominally open, but on gripping the cable bight P are locked over it by its pressure upon a washer X, thus giving a convenient configuration to the grapnel to permit it to pass on to the drum A while the cable bight P is being wound up and the load lifted to the floor of the aeroplane. Four prongs may be used but only two are shown for clearness. Where the grapnel is of such a form that it cannot pass the drum, the trolley with its load complete is bodily lifted, but the cable or wire between the grapnel and the load may be wound up on the carrier by the two ends which are attached to the axle of one of the ropeway wheels as shown in Figs. 6, 6ª, 6ᵇ, and 6ᶜ. The forward wheel as shown in the figures has an axle 1 to which it is fixed and the two ends 2 and 2ª of the wire which forms the loop picked up by the grapnel are also made fast to the axle. The rotation of the wheel causes the inwinding of the wire, which pulls at a very short radius while the wheel periphery by its frictional contact with the ropeway acts as a long radius, the carriage of course being thereby drawn forward at a speed slightly in excess of the rate of flight of the aeroplane. Where the coefficient of friction between periphery and ropeway is too low, and the wheel slides instead of rotates positive rotation of the wheel may be insured by the addition of an outer wheel (keyed on the shaft) marked Y, in Figs. 6ª, 6ᵇ, and 6ᶜ, and shown dotted in the first and last of the three figures. This wheel revolves in unison with the ropeway wheel by the following means: A supplementary line (shown dotted and marked Z in Figs. 6ª and 6ᵇ) is attached at one end to the starting post and suspended alongside the main ropeway, first being given one or more complete turns around the wheel Y whereby the frictional grip is much enhanced. The carrier when dragged forward is thus caused to gradually wind in the wire by which it is dragged. The supplementary line ends in a loop slipped over a short pin projecting upward marked 3 in Figs. 6ª and 6ᵇ at the end of a steel blade marked 4 in Figs. 6ª, 6ᵇ, and 6ᶜ so that the end of the line becomes detached by the passage over it of the wheel Y. A ratchet wheel 5 and detent 6, see Figs. 6 and 6ª, prevent the weight of the load (when suspended) from unwinding the portion of the loop previously wound in. For use at sea, a spar as shown in Fig. 7 (marked S) may be rigged, being held by suitable stays and being equipped with two vertical supplementary spars to hold open the bight of the towing cable P leading from the marine carrier O, whereby the grapnel D readily engages with it and drags it away from all fastenings, gradually giving it velocity and ultimately lifting it up as described in connection with the ground equipment. Where the ground is suitable, the wire ropeway may be dispensed with and a four wheel carrier be used on *terra firma*. Thus the energy of the winding mechanism on the aeroplane, after having given the necessary motion of translation to the load, is employed in raising the load until the grapnel is brought approximately up to the winding drum when the load can be man handled on the aeroplane.

By the means above described it is not necessary to subject the aeroplane body to any stress materially greater than that necessary to raise the weight off the ground, since (disregarding friction) a horizontal force equal to gravity acting upon a body will cause it to acquire in a given time the same velocity as it would naturally acquire in falling during that same period of time. Hence an aeroplane with a velocity in flight of 64 feet per second, by producing upon a load a horizontal pull equal to the weight of that load, would in two seconds have given it a motion of translation equal to its own velocity.

The wire ropeway or its equivalent may be obviously set up in alinement with the wind, thus making it easy for the aeroplane pilot to maintain a course directly over the wire. Ratchet gearing may operate bells of two different tones in connection with the cable drum, so that the paying out of the cable and then the inwinding may show by audible indications the condition of the operation.

Aeroplanes employed in dropping explosives or carrying despatches or mails, may by this invention carry on their work continuously, and avoid the risks of injury due to continually alighting to be loaded up. Petrol supply can also be effected by placing a can or cans in the carrier.

Shock absorbing springs may be introduced in any part of the winding gear, such as where the grapnel is attached to the cable, in order to take up minor irregularities of stress. Thus, as shown dotted in Fig. 1, a spring controlled arm $A^1$ and pulley $A^2$ may temporarily deflect the grapnel cable so that when the grapnel engages, the first shock may be eased off by the movement of the arm while the drum is acquiring speed.

Although a particular application of my invention is herein described, I may obviously modify it without departing from the spirit of the invention, and the grapnel and drum equipment may obviously be applied to other aerial craft than the biplane selected for illustration.

I claim—

1. The combination, with an air-ship, of a revoluble automatic winding mechanism carried by the air-ship, a flexible hoisting device provided with a grapple and adapted to be automatically wound in or let out by the said winding mechanism, and means for temporarily supporting a load in the path of the said grapple so that the load can be picked up and hauled aboard the air-ship during its flight.

2. The combination, with an air-ship, of a winding mechanism carried by the air-ship and provided with an automatic driving clutch and having also a flexible hoisting connection provided with a grapple, said clutch being arranged to slip when the tension on the hoisting connection exceeds a prearranged limit, and means for temporarily supporting a load in the path of the said grapple so that the load can be picked up by the air-ship during its flight.

3. The combination, with an air-ship, of a grapple device carried by the air-ship, a stationary track, a carrier for the load movable on the said track and provided with a flexible connection, and supports which temporarily hold the said flexible connection spread out in the path of the said grapple device so that the load can be picked up by the air-ship during its flight without severe shock.

4. The combination, with an air-ship, of a grapple device carried by the air-ship, a stationary track, a carrier for the load movable on the said track and provided with a flexible connection, an automatic brake mechanism connected to the said carrier and restricting its speed upon the said track, and supports which temporarily hold the said flexible connection spread out in the path of the said grapple device so that the load can be picked up by the air-ship during its flight without shock or collision.

In testimony whereof I have affixed my signature, in presence of two witnesses.

CHARLES SCOTT SNELL.

Witnesses:
FRANCIS HERON ROGERS,
O. J. WORTH.